United States Patent
Simonsson et al.

(10) Patent No.: US 8,838,118 B2
(45) Date of Patent: Sep. 16, 2014

(54) METHODS AND ARRANGEMENTS IN A WIRELESS COMMUNICATION SYSTEM

(75) Inventors: Arne Simonsson, Gammelstad (SE); Per Burström, Lulea (SE); Peter De Bruin, Gammelstad (DE); Bo Hagerman, Tyresö (SE); Per Skillermark, Arsta (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 75 days.

(21) Appl. No.: 13/502,939

(22) PCT Filed: May 3, 2011

(86) PCT No.: PCT/SE2011/050554
§ 371 (c)(1),
(2), (4) Date: Apr. 19, 2012

(87) PCT Pub. No.: WO2012/150881
PCT Pub. Date: Nov. 8, 2012

(65) Prior Publication Data
US 2012/0282934 A1    Nov. 8, 2012

(51) Int. Cl.
 H04W 40/00    (2009.01)
 H04W 72/12    (2009.01)
 H04W 92/20    (2009.01)
(52) U.S. Cl.
 CPC .............. *H04W 72/12* (2013.01); *H04W 92/20* (2013.01)
 USPC .......................................... 455/446; 455/423
(58) Field of Classification Search
 None
 See application file for complete search history.

(56) References Cited

U.S. PATENT DOCUMENTS

2010/0304682 A1    12/2010  Choi et al.
2011/0124345 A1*    5/2011  Lee et al. .................... 455/452.2

FOREIGN PATENT DOCUMENTS

WO    WO 2011/022733    2/2011

OTHER PUBLICATIONS

International Search Report and Written Opinion mailed Feb. 13, 2012 in corresponding Application No. PCT/SE2011/050554.
TSG-RAN WG1 #7, Motorola: "CoMP Operation and Evaluation", 3GPP Draft; R1-091935; Apr. 29, 2009, XP050339413.

* cited by examiner

*Primary Examiner* — Erika A Washington
(74) *Attorney, Agent, or Firm* — Nixon & Vanderhye P.C.

(57) ABSTRACT

Method and arrangement (600) in a first network node (120-1), serving a first cell (130-1), for forming a coordination group for coordinating multipoint wireless communication. The method comprising determining (502) interference within the first cell (130-1). Also, the method comprises identifying (503) a second network node (120-2), which is either transmitting radio signals causing the interference, serving a user equipment (110-1), which transmits radio signals causing the interference, or being the intended recipient of radio signals causing the interference. Additionally, the method comprises transmitting (504) a token to the identified second network node (120-2), inviting it to coordinate the wireless communication. Furthermore, in addition, if acceptance is received, the method comprises forming (505) a coordination group together with the second network node (120-2), and coordinate the wireless communication.
Further, a method and arrangement (800) in a second network node (120-2) is presented.

20 Claims, 8 Drawing Sheets

→ Serving radio signal
--→ Interfering radio signal

METHODS AND ARRANGEMENTS IN A WIRELESS COMMUNICATION SYSTEM

This application is the U.S. national phase of International Application No. PCT/SE2011/050554 filed 3 May 2011 which designated the U.S., the entire contents is hereby incorporated by reference.

TECHNICAL FIELD

The present disclosure relates to a method and arrangement in a first network node and to a method and arrangement in a second network node. In particular, it relates to coordinating multipoint wireless communication between the first network node and the second network node.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, e-readers, laptops with wireless capability etc. The user equipment units in the present context may be, for example, portable, pocket-storable, hand-held, computer-comprised, or vehicle-mounted mobile devices, enabled to communicate voice and/or data wirelessly, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

In 3rd Generation Partnership Project (3GPP) Long Term Evolution (LTE), network nodes, or base stations, which may be referred to as eNodeBs or even eNBs, may be connected to the core network directly or e.g. via a gateway such as e.g. a radio access gateway. The gateway may in turn be connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3GPP has undertaken to evolve further the UTRAN and GSM based radio access network technologies.

The 3GPP is responsible for the standardization of GSM, UMTS and LTE. LTE is a technology for realizing high-speed packet-based communication that may reach high data rates both in the downlink and in the uplink, and is thought of as a next generation mobile communication system relative UMTS.

In the present context, the expression downlink is used for the transmission path from the network node to the user equipment. In some literature, the transmission path from the network node to the user equipment may sometimes be referred to as downstream, or forward link. The expression uplink is used for the transmission path in the opposite direction i.e. from the user equipment to the network node. This is sometimes referred to as upstream or backward link.

Coordinated Multipoint transmission and reception (CoMP) is considered a feature that may enhance the performance of mobile radio networks/wireless communication systems. In short, when using coordinated multipoint cells that normally operate independently are formed into cooperating groups and transmissions and receptions within this group of cells are coordinated. In the downlink, the coordination may be implemented as, e.g., coordinated scheduling, coordinated beam forming or coordinated joint processing. In the uplink, the cells within the coordination area may be used as a large antenna array (with well separated antenna elements), which improves the receive diversity and interference suppression capabilities.

To take full advantage of the coordination, coordinated multipoint cells may be grouped such that cells within the group have a large mutual dependence whereas cells in different groups have a low dependence. The potential performance gains of coordinated multipoint cells may typically increase with the size of the coordinated cell. However, real-world constraints such as e.g. transport network capacity and delays, signal processing capabilities and complexity limits the practical size of the coordinated multipoint cells.

In scenarios where the environment, deployment, and traffic is homogeneous a way of forming coordination areas for coordinating cells may be to group cells together based on that the cells are geographically close. Such a method may, however, not be very well suited in a case where the environment, the deployment or the traffic is heterogeneous and/or is time variant.

The previously known methods of forming CoMP cells suffer from a plurality of problems, such as for example that they presupposes a centralized processing unit, they concern static or semi-static coordinated multipoint cell group selection based on statistics and are thereby not suitable for dynamic adaptation to changed radio propagation conditions, and that they does not change the overall coordinated multipoint cell group composition, rather captures subset operation on a per user equipment base.

The question of adapting the coordinated multipoint cell group members dynamically is however important in order to have an efficient utilization of the increased complexity introduced in the network. The formation of a coordinated multipoint cell implies an increased level of hardware processing and backhaul capacity than what is the case in traditionally deployed networks that are uncoordinated. Due to the inherent trade-off between increased number of included cells (typically more cells gives improved performance) and increased complexity, a foreseeable problem of forming coordinated multipoint cell groups is under utilization. That is, groups of cells that do not show capacity or coverage performance as expected from their size while other cells, not members in the group, may have contributed more positively for the same complexity.

Deployments may change, e.g., since new cells are added and some cells may be removed. Furthermore, cells may be turned on/off by Radio Resource Management (RRM) algorithms, e.g., to optimize energy usage of the network node. Traffic patterns may change, e.g. over the day; high/low traffic, geographically; home/office, etc. In an environment with changing deployments and changing traffic, there is a need for improved methods beyond the centralized methods in the prior art to act and update the coordinated multipoint cell group members on the actual experienced deployment.

SUMMARY

It is therefore an object to obviate at least some of the above mentioned disadvantages and to improve the performance in a wireless communication system.

According to a first aspect, the object is achieved by a method in a first network node serving a first cell. The method aims at forming a coordination group for coordinating multipoint wireless communication. The method comprises determining interference within the first cell. Further, the method comprises identifying a second network node, which is either transmitting radio signals causing the interference within the first cell, serving a first user equipment, which transmits radio signals causing the interference within the first cell, or being the intended recipient of radio signals causing the interference within the first cell. Further, the method comprises transmitting a token to the identified second network node, inviting the second network node to coordinate the wireless communication with the first network node. Additionally, the method also comprises, if an acceptance is received from the second network node, forming a coordination group together with the second network node, and coordinating the wireless communication of the first network node with the second network node.

According to a second aspect, the object is achieved by an arrangement in a first network node serving a first cell. The arrangement aims at forming a coordination group for coordinating multipoint wireless communication. The arrangement comprises a processing circuit, configured to determine interference within the first cell. Further, the processing circuit is also further configured to identify a second network node. Additionally, the processing circuit is also configured to form a coordination group together with the second network node. Further, the arrangement also comprises a receiver, configured to receive, from the second network node an acceptance of an invitation. Also, the arrangement further comprises a transmitting mechanism. The transmitting mechanism is configured to transmit a token to the identified second network node, inviting the second network node to coordinate the wireless communication with the first network node.

According to a third aspect, the object is achieved by a method in a second network node. The method aims at forming a coordination group for coordinating multipoint wireless communication. The method comprises receiving a token from the first network node. The token is inviting the second network node to coordinate the wireless communication with the first network node. Also, the method comprises evaluating if it is advantageous to coordinate the wireless communication of the second network node with the first network node. Further, the method comprises transmitting a response comprising an acceptance to the received token, to be received by the first network node, if it is advantageous to coordinate the wireless communication with the first network node. Otherwise the response comprises a rejection. In further addition, the method comprises forming a coordination group together with the first network node, coordinating the wireless communication with the first network node, if it is advantageous to coordinate the wireless communication with the first network node.

According to a fourth aspect, the object is achieved by an arrangement in a second network node. The arrangement aims at forming a coordination group for coordinating multipoint wireless communication. The arrangement comprises a receiver. The receiver is configured to receive a token from the first network node, which token is inviting the second network node to coordinate the wireless communication with the first network node. Also, the arrangement comprises a processing circuit, configured to evaluate if it is advantageous to coordinate the wireless communication with the first network node. The processing circuit is also configured to form a coordination group together with the first network node. In addition, the processing circuit is further configured to coordinate the wireless communication with the first network node, if it is advantageous to coordinate the wireless communication with the first network node. Additionally, the arrangement also further comprises a transmitting mechanism, configured to transmit a response comprising an acceptance to the received token, to be received by the first network node. The acceptance is transmitted if it is advantageous to coordinate the wireless communication with the first network node, otherwise the response comprises a rejection.

Embodiments of the herein presented methods and arrangements provide a concrete, distributed and at least somewhat automated method for self-organization of coordination groups/coordinated multipoint cells in a wireless communication system. Thereby increased radio signal quality and interference suppression is achieved, both in downlink and uplink, without the need for a central controller functionality that handles the complicated task of forming coordination groups/coordinated multipoint cells.

Embodiments of the present methods and arrangements actually form coordination groups/coordinated multipoint cells in a distributed manner. The benefit of this is that, although the processing hardware of such a group may be located anywhere in the constituting access nodes of the coordination groups/coordinated multipoint cell, or in a separate node, it is clear that the coordination group/coordinated multipoint cell as such may employ joint processing and that it will be able to perform any coordinated transmission and/or reception scheme to/from user equipment units within its serving area.

Thereby the coordination group may split, or invite another network node, or join another coordination group. Further, the coordination group may decide to re-organize itself, for instance by splitting into sub-groups, which provides the disclosed method and arrangement a distributed, dynamic and adaptive network solution. Thus an improved performance within the wireless communication system is achieved.

Other objects, advantages and novel features will become apparent from the following detailed description of the present method and user equipment.

BRIEF DESCRIPTION OF THE DRAWINGS

The methods and arrangements are described in more detail with reference to attached drawings illustrating some examples of embodiments, in which.

DETAILED DESCRIPTION

Embodiments herein are defined as a method and arrangement in a first network node, and as a method and arrangement in a second network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1:
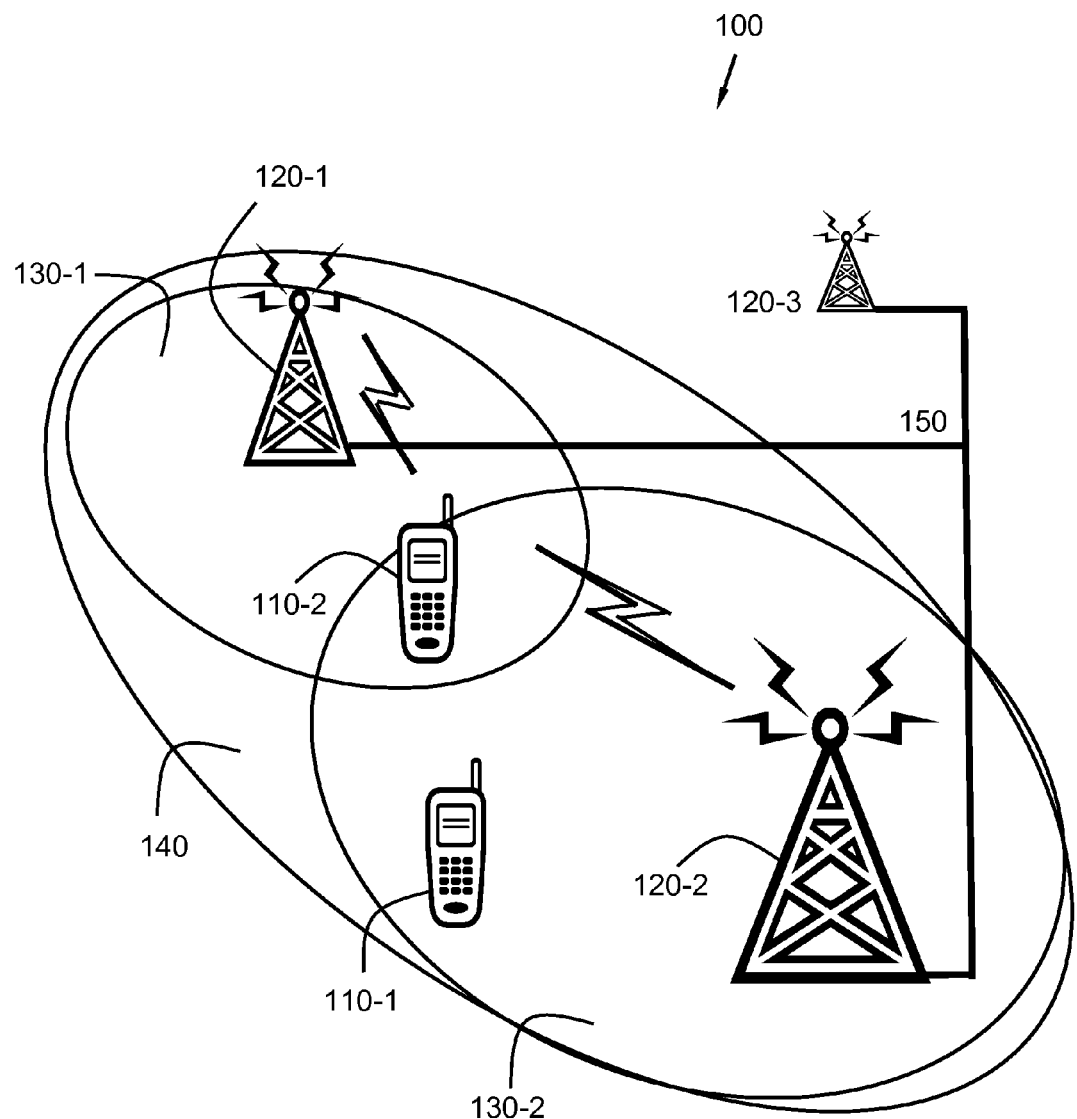
FIG. 1 is a schematic illustration of a wireless communication system for coordinating multipoint wireless communication between network nodes, according to some embodiments.

FIG. 1 depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 1 is to provide a simplified, general overview of the present method and the functionalities involved. The present methods and arrangements will herein, as a non-limiting example, be described in a 3GPP/LTE environment.

The wireless communication system 100 comprises at least a first network node 120-1 and a second network node 120-2, arranged to communicate with each other. The wireless communication system 100 may further comprise another network node 120-3. Further, a first user equipment 110-1 may be served by the second network node 120-2 while a second user equipment 110-2 may be served by the first network node 120-1, according to some embodiments.

The first network node 120-1 is serving a first cell 130-1 while the second network node 120-2 is serving a second cell 130-2. According to some embodiments, the method for coordinating multipoint wireless communication between the first network node 120-1 and the second network node 120-2 may comprise forming a common cell 140.

Further, the first network node 120-1, the second network node 120-2 and the other network node 120-3 may communicate with each other over a backhaul 150. The backhaul 150 may comprise a wired or wireless communication link, according to different embodiments. The backhaul 150 may e.g. comprise an intra base station interface 150, such as X2, according to some embodiments.

The user equipment 110-1, 110-2 is configured to transmit radio signals comprising information to be received by the first network node 120-1, the second network node 120-2 and the other network node 120-3. Contrariwise, the user equipment 110-1, 110-2 is configured to receive radio signals comprising information transmitted by the network nodes 120-1, 120-2, 120-3.

It is to be noted that the illustrated network setting of network nodes 120-1, 120-2, 120-3 and user equipment 110-1, 110-2 in FIG. 1 is to be regarded as a non-limiting example of an embodiment only. The wireless communication system 100 may comprise any other number and/or combination of network nodes 120-1, 120-2, 120-3 and or user equipment units 110-1, 110-2, although three instance of network nodes 120-1, 120-2, 120-3 and two instances of a user equipment 110-1, 110-2, respectively are illustrated in FIG. 1 for clarity reasons. A plurality of network nodes 120-1, 120-2, 120-3 and/or user equipment units 110-1, 110-2 may further be involved in the present methods according to some embodiments.

Thus whenever "one" or "a/an" network node 120-1, 120-2, 120-3 and/or user equipment 110-1, 110-2 is referred to in the present context, a plurality of network nodes 120-1, 120-2, 120-3 and/or user equipment units 110-1, 110-2 may be involved, according to some embodiments.

The first network node 120-1, the second network node 120-2 and/or the other network node 120-3 may be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, relay and/or repeater, sensor, beacon device or any other network node configured for communication with user equipment 110-1, 110-2 over a wireless interface, depending e.g. of the radio access technology and terminology used. Further, according to some scenarios, the wireless communication system 100 may comprise a heterogeneous network (HetNet) wherein the comprised network nodes 120-1, 120-2, 120-3 operate on different transmission power.

Thus, in a non-limiting example, the first network node 120-1 may comprise a macro base station while the second network node 120-2 comprises a pico base station, or vice versa etc. However, the wireless communication system 100 may comprise a homogenous network, wherein the comprised network nodes 120-1, 120-2, 120-3 operate on approximately the same transmission power.

In the rest of this disclosure, the term "first network node" "second network node" and "other network node" respectively will be used for the first network node 120-1, second network node 120-2 and other network node 120-3, respectively, in order to facilitate the comprehension of the present methods.

The first and second user equipment 110-1, 110-2 may be represented by e.g. a wireless communication terminal, a mobile cellular phone, a Personal Digital Assistant (PDA), a wireless platform, a mobile station, a portable communication device, an e-reader, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the network nodes 120-1, 120-2, 120-3.

The first network node 120-1 controls and serves the radio resource management within the first cell 130-1, such as e.g. allocating radio resources to the second user equipment unit 110-2 within the first cell 130-1 and ensuring reliable wireless communication links between the first network node 120-1 and the second user equipment 110-2. Thus, in an LTE environment, the cells 130-1, 130-2 may be controlled by an eNB each, which may provide the baseband processing, higher-layer protocol handling and/or interfaces the cell, comprising a number of antenna heads, to the surrounding radio network architecture.

The first network node 120-1 may alternatively comprise a NodeB in conjunction with a Radio Network Controller (RNC), e.g. in a WCDMA environment, according to some embodiments. This may be the situation also for the second network node 120-2 in relation to the second cell 130-2, etc. The Radio Network Controller may be a governing element in a WCDMA wireless communication network 100, responsible for control of the Node B, which may be connected to the Radio Network Controller. The Radio Network Controller may carry out radio resource management and some of the mobility management functions, to mention some examples.

Embodiments of the methods and arrangements herein presented provides a distributed token based solution to form suitable CoMP coordination areas and to, over time, adapt the CoMP coordination areas according to the deployment and traffic conditions.

A token within the context herein is a unique identifier that is generated at a network node 120-1, 120-2, 120-3 or a coordination group/CoMP group and may be transmitted to another network node 120-1, 120-2, 120-3, inviting that other network node 120-1, 120-2, 120-3 to form a coordination group/CoMP group together. A particular network node, or coordination group/CoMP group may according to some embodiments hold only one token at the time. The purpose of the token is to limit the number of invitations transmitted, thereby also limiting the speed of expansion of the size of the formed coordination group/CoMP group, i.e. the number of network nodes 120-1, 120-2, 120-3 comprised in the coordination group/CoMP group.

However, one token may be associated with a resource block, enabling different cell groups for different parts of the spectrum according to some embodiments. A resource block in LTE may comprise a 200 kHz wide and 1 ms long transmission time interval (TTI) scheduling unit. Tokens for LTE may be associated for resource blocks in frequency domain only, or time domain only, or in both domains. For time associated tokens, one embodiment may comprise to create a frame of several TTI:s with a token for each TTI. Other accesses may have different scheduling units in time only (Such as e.g. for WCDMA: 2 ms TTI, which may be 5 MHz wide) or frequency only. Further, each cell may alternatively use multiple tokens with a fraction of the frequency band assigned to each token.

A token may comprise various fields comprising e.g. an identifier of the network node 120-1, 120-2, 120-3, or coordination group/CoMP group that owns or has generated the token.

Initially, in one embodiment, all network nodes 120-1, 120-2, 120-3 may be provided with, or generate, one token each. The token may primarily be regarded as an indicator, and is in the current context utilized to signal an interest in cooperating with another network node 120-1, 120-2, 120-3. Each network node 120-1, 120-2, 120-3 may also monitor some metric that is associated with the (estimated) performance gains that may be realized if it forms a coordination area together with any of the neighbour network nodes 120-1, 120-2, 120-3. If any of the network nodes 120-1, 120-2, 120-3 estimates that a performance gain may be achieved by forming a coordination area together with a particular other network node 120-1, 120-2, 120-3 it may invite that network node 120-1, 120-2, 120-3 to join in such a coordination group, or CoMP group, by throwing its token on the network node 120-1, 120-2, 120-3. If the invited network node 120-1, 120-2, 120-3 disagrees and hands back the token, the network node 120-1, 120-2, 120-3 that firstly sent the token may reuse the token and search for other partner network nodes 120-1, 120-2, 120-3. If the inviting and invited network nodes 120-1, 120-2, 120-3 form a coordination area, a so called CoMP group, the two tokens of the different inviting and invited network nodes 120-1, 120-2, 120-3 are merged into one so that the group now only has one token. The CoMP group may be formed without changing the logical topology of the network, meaning that the rest of the network may not need to know that network nodes 120-1, 120-2, 120-3 in a coordination area are cooperating. It is also possible to allow the CoMP group of network nodes 120-1, 120-2, 120-3 to appear as a single cell 140 to other network nodes 120-1, 120-2, 120-3, in the spirit of what is known as so called cell-join/split schemes. Either way, the distributed manner of finding local partner network nodes 120-1, 120-2, 120-3 may continue according to some embodiments.

Network nodes 120-1, 120-2, 120-3 within a coordination area may also continuously evaluate whether the current grouping is beneficial from a performance perspective according to some embodiments. If it is not, any network node 120-1, 120-2, 120-3 may request to break out from its current group and form an independent cell 130. In that case, the network node 120-1, 120-2, 120-3 gets back its token and acts as any other independent network node 120-1, 120-2, 120-3, according to some embodiments.

Figure 2A:
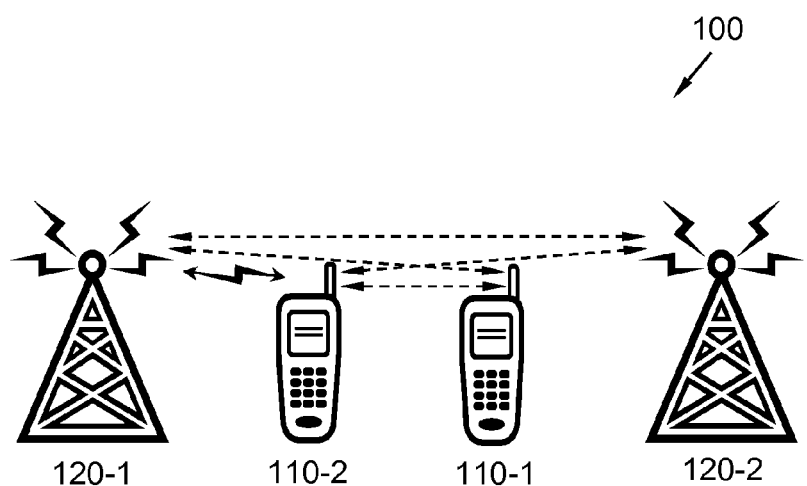
FIG. 2A is a schematic illustration of a wireless communication system exposed for signal interference, according to some embodiments.

FIG. 2A illustrates the wireless communication system 100, comprising the first network node 120-1 and the second network node 120-2. The first user equipment 110-1 is served by the second network node 120-2 while the second user equipment 110-2 is served by the first network node 120-1. The first network node 120-1 is serving a first cell 130-1, in which the second user equipment 110-2 is situated.

In the illustrated scenario, interference within the first cell 130-1 may comprise inter base station interference whereby radio signals transmitted in the downlink from the second network node 120-2, to be received by the first user equipment 110-1 is causing interference at the first network node 120-1. Interference within the first cell 130-1 may further comprise uplink interference of radio signals transmitted in the uplink from the first user equipment 110-1, to be received by the second network node 120-2, but which signals are interfering the reception of radio signals at the first network node 120-1.

However, interference within the first cell 130-1 may also comprise interference detected by the second user equipment 110-2, served by the first network node 120-1. Such interference detected by the second user equipment 110-2 may comprise interference from the first user equipment 110-1, served by the second network node 120-2, or interfering signals transmitted by the second user equipment 110-2, e.g. in case the user equipment 110-1, 110-2, are not synchronised. The first network node 120-1 may receive an indication from the second user equipment 110-2, informing the first network node 120-1 about the detected interference.

If the first network node 120-1 measures and detects interference from another node, such as e.g. the second network node 120-2, or receive one or more reports from one or more user equipment 110-2 within the first cell 130-1, such that e.g. interference above a threshold level is detected, a decision to suggest forming a coordination group for coordinating multipoint wireless communication may be made.

In downlink the interference may be estimated based on handover measures reported by the user equipment 110-2 to the first network node 120-1. For LTE neighbour cell signal strength Reference Signal Receive Power (RSRP) may be reported per cell and distinguish which cell the user equipment 110-1, 110-2 potentially may be interfered from. Reference Signal Received Quality (RSRQ) is another measurement that may indicate the signal to interference ratio. Combined an interference level and source cell may be estimated. Similar handover reports and measures exist for WCDMA and GSM.

Having decided to suggest forming such coordination group, the first network node 120-1 may invite the second network node 120-2 to form the coordination group by transmitting its token to be received by the second network node 120-2.

The second network node 120-2, upon receiving the token from the first network node 120-1 may use a performance metric to evaluate the utility of grouping with the first network node 120-1, such as e.g. detected interference from the first network node 120-1. Also other metrics and/or restrictions may be checked by the second network node 120-2 such as e.g. the capacity of the backhaul 150, a size limit of the number of network nodes 120-1, 120-2, 120-3 that are allowed in the coordination group according to some embodiments.

If the second network node 120-2 considers it appropriate to form the coordination group together with the first network node 120-1, an acceptance is returned to the first network node 120-1. When the first network node 120-1 receives the acceptance from the second network node 120-2, they may form a coordination group together and start coordinating the wireless communication. The first network node 120-1 and the second network node 120-2 may thus be combined into a CoMP group, for sharing data for processing. Logically within the network, the first network node 120-1 and the second network node 120-2 may remain independent nodes according to some embodiments, or forming a common cell 140, according to other embodiments. The coordination group comprising the first network node 120-1 and the second network node 120-2 is provided with one token, and the above described measurements may be reconsidered with regard to another network node 120-3, with which it may be considered beneficial to cooperate with etc. Conversely, any other network node 120-3 that measures a positive performance metric for cooperating with any of the first network node 120-1 or the second network node 120-2 in the coordination group may initiate the grouping procedure by transmitting its token to the first network node 120-1, or the second network node 120-2. It then has to be evaluated if it is beneficial to form a coordination group together comprising the first network node 120-1, the second network node 120-2 and the other network node 120-3, or if it is perhaps more beneficial e.g. for the first network node 120-1 to leave the coordination group together with the second network node 120-2 and instead form a new coordination group together with the other network node 120-3 etc.

An alternative embodiment may be set in a future release of an LTE radio network, or by proprietary vendor functionality, where a plurality of cells 130, 140 forms part of the wireless communication system 100 as a whole. Each original cell 130, 140 may be controlled by its own network node 120-1, 120-2, 120-3. In LTE, where the network node 120-1, 120-2, 120-3 may comprise an eNB, one eNB may handle several cells 130, 140, up to 255 cells according to LTE Rel.8; which provides baseband processing, higher-layer protocol handling and interfaces the cell, comprising a number of antenna heads to the surrounding radio network architecture.

Figure 2B:
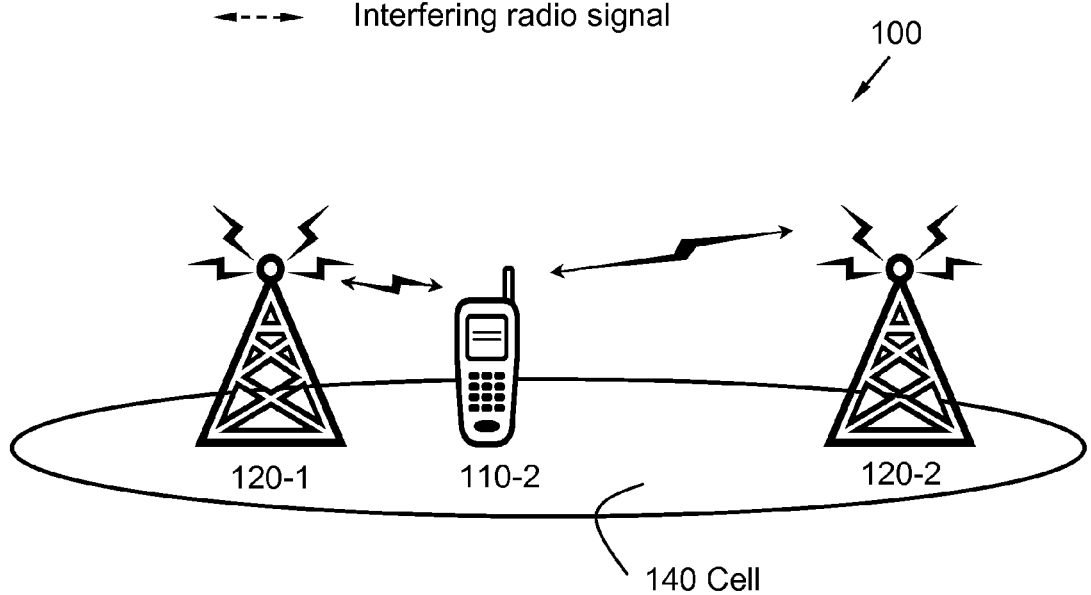
FIG. 2B is a schematic illustration of a wireless communication system for coordinating multipoint wireless communication between network nodes, according to some embodiments.

FIG. 2B illustrates the wireless communication system 100, comprising the first network node 120-1 and the second network node 120-2, which together are forming a combined CoMP group and a new common cell 140. Logically, cell 140 may be just another cell 130, within the wireless communication system 100, sharing cell ID, reference symbols, and associated properties. The common cell 140 may hold one token to be thrown at any other network node 120-3, it may be considered beneficial to cooperate with. Conversely, any other network node 120-3 that measures a positive performance metric for cooperating with cell 140 might initiate the grouping procedure.

Either way which step is performed, the coordination group, or CoMP group, may use any coordinated transmission or reception scheme to serve user equipments 110-1, 110-2 that may benefit from it, as determined by measuring CoMP metrics.

Figure 3:
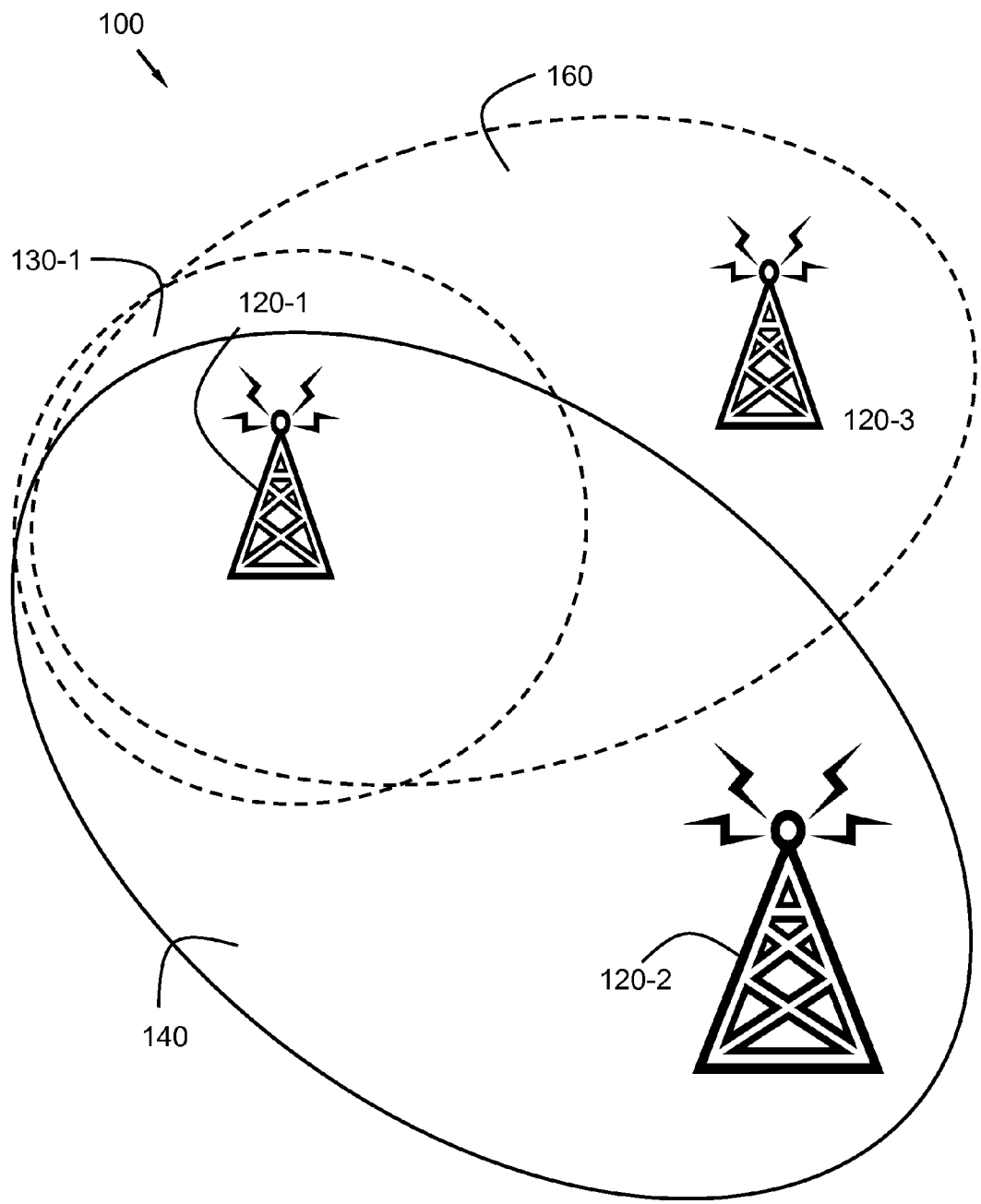
FIG. 3 is a schematic illustration of a wireless communication system for coordinating multipoint wireless communication between network nodes, according to some embodiments.

This is further illustrated in FIG. 3, wherein the above described scenario is depicted. The first network node 120-1 has formed a coordination group together with the second network node 120-2, and also a common cell 140. However, the first network node 120-1 has detected interference from another network node 120-3, and thereby may start to evaluate what is most beneficial: to invite the other network node 120-3 to join the coordination group; to split the existing coordination group with the second network node 120-2 and not forming any coordination group with any other node, just forming the cell 130-1, and/or send the token of the first network node 120-1 to the other network node 120-3, inviting it to form a coordination group and possibly also a common cell 160 together.

Further, some embodiments of the method comprise having one token per resource block. Thereby may different cell groups be enabled for different parts of the spectrum. In addition, according to some alternative embodiments, each cell may be allowed to use multiple tokens with a fraction of the frequency band assigned to each token.

According to some alternative embodiments, the user equipment units 110 within the first cell 130-1 may be divided into orthogonal groups giving each group of user equipment a token. Further, resource blocks may be assigned to each subgroup of user equipment units 110 and send tokens to different neighbour network nodes 120-1, 120-2, 120-3.

Figure 4:
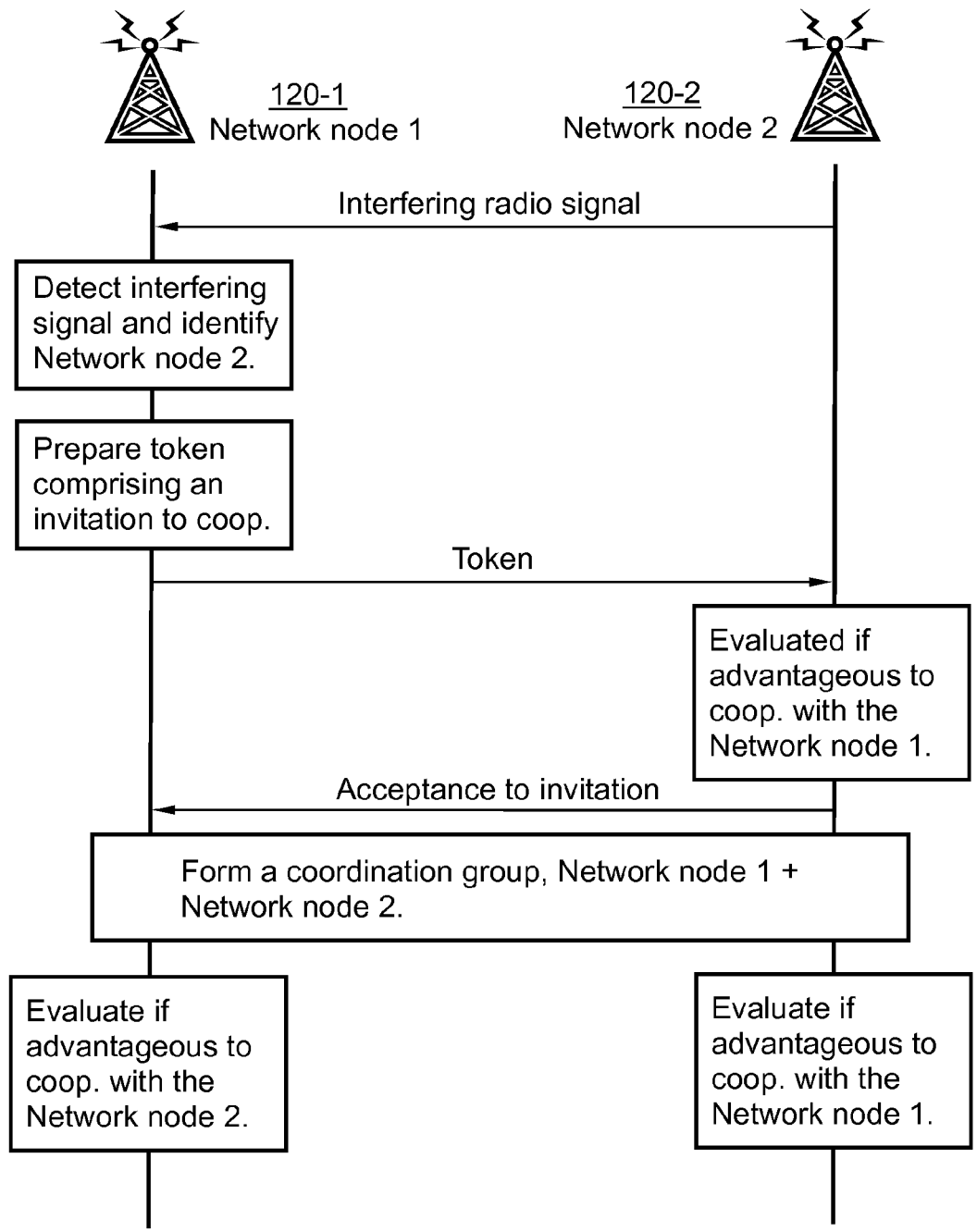
FIG. 4 is a combined flow chart and block diagram illustrating an embodiment of the present methods.

FIG. 4 is a combined flowchart and block diagram illustrating an overview of an example of a non-limiting embodiment of the present method for forming a coordination group.

The method may comprise a plurality of actions, in order to efficiently forming a coordination group for coordinating multipoint wireless communication in the wireless communication system 100, such as the ones subsequently described. However, the described actions may be performed in a somewhat different order than the herein utilised order of appearance, which is merely an example according to different embodiments. Also, some of the described actions may be performed within some alternative embodiments, but not necessarily within all embodiments, while some further additional actions, described in more detail elsewhere within this disclosure may be performed within some embodiments.

Firstly, the first network node 120-1 and the second network node 120-2 may be provided with a token each.

Further, the first network node 120-1 detects interference caused by a signal transmitted by the second network node 120-2, which may be a neighbour network node transmitting signals intended to be received by user equipment 110-1 situated within a second cell 130-2, which is served by the second network node 120-2.

CoMP may also improve coverage in non-interference situation. Joint transmission and reception from/to several network nodes 120-1, 120-2, 120-3 when on the cell border may improve significantly. In one embodiment, instead of interference, the signal strength (RSRP) or geometry factor may only be detected indicated gain from joint transmission and/or reception.

Upon detecting the interference, the first network node 120-1 may determine the level of interference, e.g. by scaling it, or comparing the interference against a threshold level value. Also, the second network node 120-2 may be identified by the first network node 120-1.

Such identification may be done by recognising a distinct code comprised in the signalling received from the second network node 120-2, such as e.g. a Base Station Identity Code (BSIC) in a GSM environment, scrambling code in WCDMA and Cell Identity in LTE. However, according to other embodiments may the second network node 120-2 be identified e.g. by determining the direction of the signal emitted by the second network node 120-2 and comparing the determined direction with acquired knowledge of the direction towards neighbour network nodes 20-1, 120-2, 120-3. These are merely some possible ways of identifying the second network node 120-2 as either the source of the interference, or serving a user equipment 110-1 which may transmit signals causing interference within the first cell 130-1.

Having identified the second network node 120-2, and determined that the interference from the signals transmitted from the second network node 120-2 is such that it would be an advantage to cooperate with the second network node 120-2, e.g. by comparing with a threshold value, a check may be made, whether it is possible to form a group together with the second network node 120-2. Thus, a condition for forming a CoMP cell/group may be that it is possible to exchange information between the first network node 120-1 and the second network node 120-2, which thus may be checked before suggesting forming such coordination group. Such condition may concern such things as the backhaul capacity of the first network node 120-1 and the second network node 120-2, and the speed of communication that may be achieved. Also, the functionality between both the first network node 120-1 and the second network node 120-2 are compatible enough for initiating the cooperation. In this way, the internal information exchange between the first network node 120-1 and the second network node 120-2 may be considered to be of such capacity that fast CSI and IQ information may readily be exchanged. Also less data intense communication such as that needed for coordinated beamforming/scheduling may be employed according to some embodiments. The processing of signals may be performed either in one of the constituting first and second network nodes 120-1, 120-2, an external computational node, or done in a distributed manner per user equipment, depending on which mode of operation the CoMP cell/group is in.

Also, according to some embodiments, a comparison may be made made against a size limitation value, limiting the number of network nodes 120-1, 120-2, 120-3 that are allowed in the coordination group, before sending the token to the second network node 120-2.

The numeral of network nodes 120-1, 120-2, 120-3 belonging to a coordination group may be determined by measured performance metric's and a size limitation of the coordination group. This limit may be a fixed number, or a utility function taking into account the backhaul requirements involved in increased grouping size, or the number of user equipment 110-1, 110-2, or the amount of joint transmission data, or be a requirement of "clique" form, meaning for addition of a new network node 120-1, 120-2, 120-3 to take place, all constituting network nodes 120-1, 120-2, 120-3 in the coordination group must see benefits, as determined by the performance metrics from cooperating with the new network node 120-1, 120-2, 120-3, according to some embodiments. The discrimination may also be made on fractions or combinations of the above suggestions, for instance the delay budget in the backhaul 150 or thresholds in interference to one or a multiple of the network nodes 120-1, 120-2, 120-3 in the existing coordination group may set the limit. The point here is not to elaborate on all possible methods of size limitation, but rather cover them all by elusive and abstract descriptions.

If the first network node 120-1 determines that it is possible to form a group together with the second network node 120-2, the token of the first network node 120-1 may be transmitted to be received by the second network node 120-2.

The token, when received by the second network node 120-2 may be interpreted as an invitation to form a coordination group together with the first network node 120-1. According to some embodiments, the token may comprise information concerning a level of estimated advantage for the first network node 120-1, to form the coordination group together with the second network node 120-2. Such information may help the second network node 120-2 in deciding whether to accept or reject the invitation to form the coordination group, e.g. in case the second network node 120-2 is evaluating to join any of several alternative coordination groups together with other network nodes 120-3 etc.

However, the second network node 120-2 may independently evaluate the possible advantage for the second network node 120-2 to form a coordination group together with the first network node 120-1. Such evaluation may comprise, or be based on one or more of comparison with a size limitation value, limiting the number of network nodes 120-1, 120-2 that are allowed in the coordination group; capacity of a backhaul 150; compatibility between the first network node 120-1 and the second network node 120-2; detected interference of radio signal reception within a second cell 130-2, served by the second network node 120-2; comparison of detected interference with a threshold value; comparing the advantage to form the coordination group with the first network node 120-1 with an estimated value of grouping with another network node 120-3, according to different embodiments.

If the evaluation made by the second network node 120-2 result in a decision that it is advantageous for the second network node 120-2 to group with the first network node 120-1, an accept may be sent in response to the token, i.e. back to the first network node 120-1. Thereafter may a coordination group be formed, comprising the first network node 120-1 and the second network node 120-2. As previously discussed, the first network node 120-1 and the second network node 120-2 may continue being independent network nodes 120-1, 120-2, 120-3 with their own cells 130-1, 130-2, 130-3, but they may also form a common cell 140, according to different embodiments. Further, the coordination group may comprise cooperation only within the downlink, or only within the uplink, according to different alternative embodiments. The coordination group may comprise cooperation in both uplink and downlink for all, or a subset of user equipment 110 situated within any cell 130-1, 130-2, 140 served by the first network node 120-1 and the second network node 120-2, according to some embodiments.

After having formed the coordination group, any or both of the first network node 120-1 and/or the second network node 120-2 may continually assess the value of belonging to the coordination group, by continuously measure one or more performance metric's.

Such performance metric may compare the value of belonging to the coordination group with the potential value of grouping to another cell or cells, or not being grouped at all, as these values change over time with changed traffic distribution, network topology and propagation environment. An example of metrics that may be used is the interference level measured in the uplink, or the downlink geometry factor of one or more user equipment units 110 as reported by RSRP measurements. The geometry factor may be calculated per neighbour cell as RSRP serving/RSRP neighbour, according to some embodiments. For instance, if a plurality of user equipment units 110-1, 110-2 report low geometry factor values to a certain other neighbour network node 120-3, it might be quite beneficial to initiate cooperation with that other neighbour network node 120-3. In one embodiment, the coordination group as a whole may use the same, or some other performance metric's to evaluate the benefits of each constituting network node's contribution to the performance. If one network node 120-1, 120-2 is deemed as having a performance contribution that is below a certain threshold, for instance due to changed traffic patterns or topology, the coordination group may discharge this network node 120-1, 120-2 from the coordination group in order to be able to attempt a grouping to some other neighbouring other network node 120-3 that is possibly more beneficial to group with, according to some embodiments.

Figure 5:
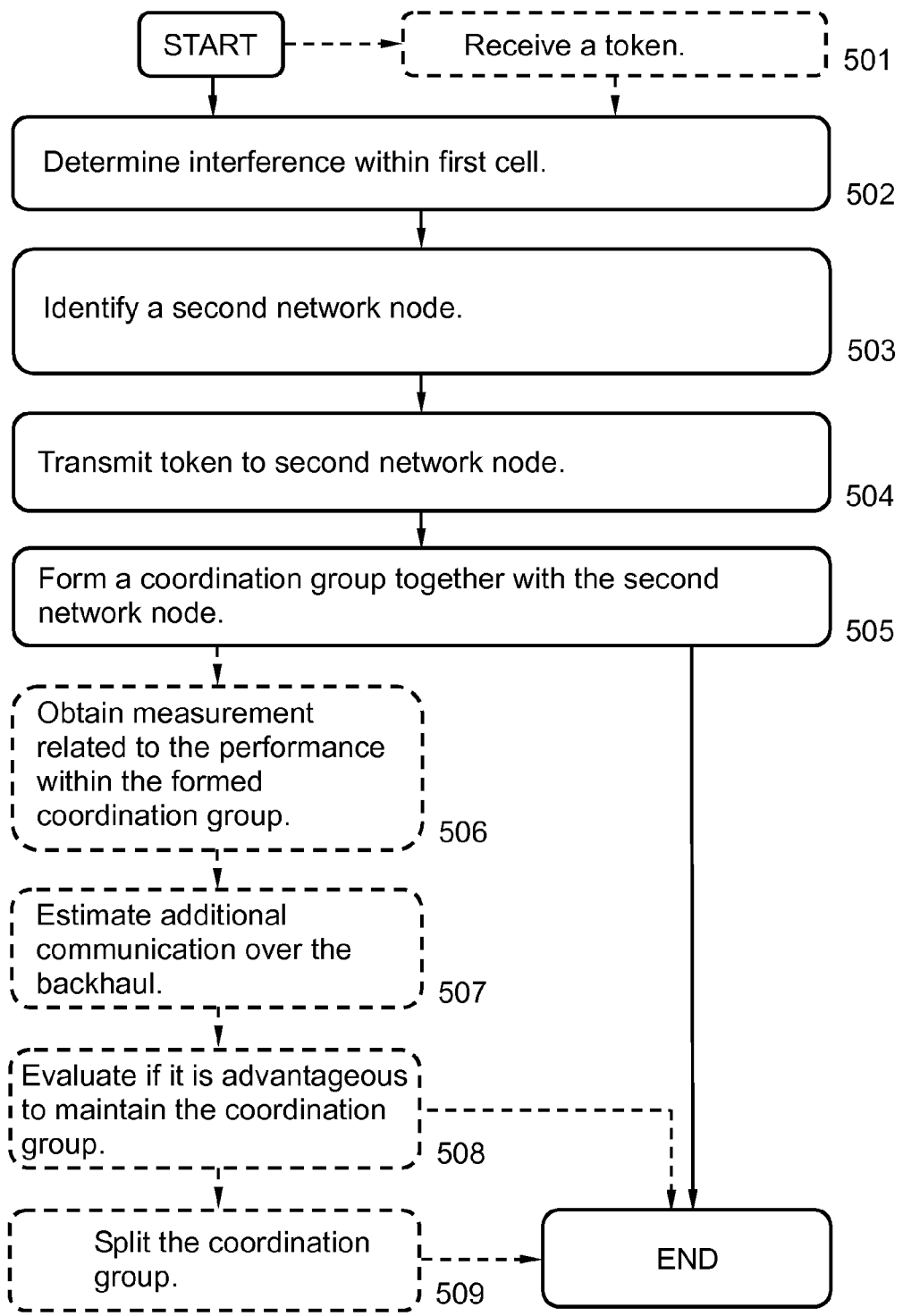
FIG. 5 is a schematic flow chart illustrating an embodiment of a method in a first network node.

FIG. 5 is a flow chart illustrating embodiments of a method in a first network node 120-1 which is serving a first cell 130-1. The method aims at forming a coordination group for coordinating multipoint wireless communication. The coordination group may be formed by the first network node 120-1 together with a second network node 120-2, which both may be comprised in a wireless communication system 100. The wireless communication system 100 may be based on e.g. the Long-Term Evolution project within the Third Generation Partnership Project according to some embodiments, wherein the network nodes 120-1, 120-2 may comprise an Evolved Node B. However, the wireless communication system 100 may be further based on WCDMA, according to some embodiments, wherein the network nodes 120-1, 120-2 may comprise a Node B, in conjunction with a Radio Network Controller, according to some embodiments.

To appropriately form the coordination group for coordinating multipoint wireless communication, the method may comprise a number of actions 501-509.

It is however to be noted that some of the described actions, e.g. action 501-509 may be performed in a somewhat different chronological order than the enumeration indicates Further, any, some or all actions, such as e.g. 502 and 503 may be performed simultaneously or in a rearranged chronological order. Also, it is to be noted that some of the actions may be performed within some alternative embodiments, such as e.g. action 501, 506-509. The method may comprise the following actions:

Action 501

This action may be comprised within some alternative embodiments, but not necessarily within all imaginable embodiments of the method.

A token is received, which token is unique for the first network node 120-1 comprised in a wireless communication system 100.

Each of the first network node 120-1, the second network node 120-2 and the coordination group is restricted to hold only one token at the time.

However, alternatively, each of the first network node 120-1, the second network node 120-2 and the coordination group may be restricted to hold only one token at the time per scheduling resource, such as e.g. resource block, such that different coordination groups are enabled for different parts of the resources, according to some embodiments.

Action 502

Interference within the first cell 130-1 is determined.

The determined interference within the first cell 130-1 may comprise receiving a report of detected interference from a second user equipment 110-2 situated in the first cell 130-1, such as e.g. handover report comprising RSRP per cell identity and/or RSRQ.

The determined interference within the first cell 130-1 may comprise a signal transmitted from the first user equipment 110-1 served by the second network node 120-2, detected by the first network node 120-1.

The determined interference within the first cell 130-1 may comprise an inter cell interference signal, transmitted from the second network node 120-2, detected by the first network node 120-1, according to some embodiments.

The determined interference within the first cell 130-1 may however be based on statistics of interference, collected over a time period and for several user equipment units 110. Such statistics of interference may comprise statistics on different kinds of interference, or magnitude on a particular source of interference, or amount or fraction of user equipment units 110 within the cell suffering from interference. Thus determining the interference may comprise collecting interference measurements from several user equipment units 110, situated at different positions and collecting for resource blocks over time and frequency, according to some embodiments.

In one embodiment the collection is done for all user equipment units 110 within the cell. The neighbour second network node 120-2 that causes interference above a certain threshold to most user equipment units 110 or samples is the preferred cell to send the token to since most user equipment units 110 and transmission benefits from that CoMP co-ordination. Combination of amount and interference level may alternatively be used, such as summing all interference energy detected per neighbour cell or some interference severity weight function average.

Action 503

The second network node 120-2 is identified, which second network node 120-2 is either transmitting radio signals causing the interference within the first cell 130-1, or serving a first user equipment 110-1, which transmits radio signals causing the interference within the first cell 130-1, or is the intended recipient of radio signals causing the interference within the first cell 130-1.

Action 504

A token is transmitted to the identified second network node 120-2, inviting the second network node 120-2 to coordinate the wireless communication with the first network node 120-1.

The token may further comprise information concerning a level of estimated advantage for the first network node 120-1, to form the coordination group together with the second network node 120-2, according to some embodiments.

A comparison may be made according to some embodiments, against a size limitation value, or size limitation metric, limiting the number of network nodes 120-1, 120-2 that are allowed in the coordination group. Such comparison may be made before forming the coordination group together with the second network node 120-2, such as e.g. before transmitting the token to the second network node 120-2, according to some embodiments.

The size limitation value may be for instance a fixed number, or an estimate of how much load the backhaul 150 is capable of handling, or a radio network metric. It is to be noted that the backhaul capacity may be different in different parts and between different network nodes 120-1, 120-2, 120-3 of the wireless communication system 100. Further, backhaul capacity may vary with load, traffic and usage patterns, according to some embodiments.

For instance, in a non-limiting example, assume that the first network node 120-1 and the second network node 120-2 are comprised in the coordination group/CoMP cell. If a token is triggered from the neighbouring network node 120-3, which may be a neighbour to the second network node 120-2, but not the first network node 120-1 because of interfering user equipment units between the second network node 120-2 and the other network node 120-3, while the second network node 120-2 is busy handling the traffic from user equipment it has in common with the first network node 120-1. Then, the coordination group/CoMP cell may determine that it is pointless to try to coordinate with the other network node 120-3 for the time being if all its resources are spent on user equipment that are not in the intersection of the coordination group/CoMP cell and the other network node 120-3.

Action 505

If an acceptance is received from the second network node 120-2, a coordination group is formed together with the second network node 120-2, and coordinating the wireless communication of the first network node 120-1 with the second network node 120-2.

The formation of the coordination group may further comprise merging the token of the first network node 120-1 with the token of the second network node 120-2.

The coordination group formed together with the second network node 120-2, may comprise defining a common cell 140, and coordinating the wireless communication of the first network node 120-1 with the second network node 120-2 within the common cell 140, according to some embodiments.

A time may has to pass after having formed coordination group, according to some alternative embodiments, before transmitting next token to another network node 120-3. Thereby may the growth velocity of the coordination group may be restricted. Also, a threshold value may alternatively be introduced so as to avoid toggling between forming and splitting the coordination group.

Action 506

This action may be comprised within some alternative embodiments, but not necessarily within all imaginable embodiments of the method.

A measurement related to performance within the formed coordination group may be obtained.

Such measurement may comprise interference from other network nodes 120-3, or from user equipment 110, or geometry factor, or number of joint transmissions, or number of co-ordinated scheduling events, or number of successful joint receptions according to different embodiments.

Action 507

This action may be comprised within some alternative embodiments, but not necessarily within all imaginable embodiments of the method.

An amount of additional communication over a backhaul 150 between the first network node 120-1 and the second network node 120-2 may be measured or estimated, after having formed 505 the coordination group.

Action 508

This action may be comprised within some alternative embodiments, but not necessarily within all imaginable embodiments of the method.

It may be evaluated if it is advantageous to maintain the coordination group or to split the group, based on the obtained 506 measurement related to the performance, and the estimated 507 amount of additional communication over the backhaul 150.

The evaluation if it is advantageous to maintain the coordination group or to split the group may further comprise comparing the estimated 507 amount of additional communication over the backhaul 150 with a backhaul load threshold value.

Thus the backhaul capacity and backhaul load may be restricted, e.g. by a backhaul load threshold, according to some embodiments.

The evaluation of the advantage to maintain the coordination group may further comprise comparing the advantage of maintaining the coordination group with an estimated advantage of instead grouping with another network node 120-3.

The evaluation may comprise checking if a measurement related to performance, such as interference, is below a threshold value. If interference from the second network node 120-2, or a user equipment 110-1 situated within the second cell 130-2 is below the threshold, it may be considered an advantage to split the coordination group, according to some embodiments.

Further, the evaluation may further also comprise checking if the backhaul 150 is loaded above a certain threshold. If it is, it may be considered an advantage to split the coordination group, according to some embodiments.

Also, in addition, the evaluation may further comprise comparing the potential interference caused by the second network node 120-2, or a user equipment 110-1 situated within the second cell 130-2, when another network node 120-3 is considered to cause higher interference and the group size limit is reached.

Thus, an interference estimation comparison may be performed, investigating if a higher interference relation exists towards a network node 120-3 outside the coordination group than inside, it may be preferred to swap those network nodes 120-2, 120-3. Typically statistical measures may be used such as the fraction of interfered transmissions for each network node 120-1, 120-2, 120-3, according to some embodiments.

A more advanced backhaul-load versus gain functions may alternatively be applied, where a lower interference relation network node 120-2 may be selected because the backhaul load for that may be significantly lower than the other network node 120-3 causing slightly more interference. The gain may be seen as a function of measured interference and backhaul load, i.e. gain=f (interference, backhaul load). The evaluation may comprise selecting to form a coordination group together by increasing or maximising the gain; or alternatively minimize total interference in the wireless communication system when utilizing the backhaul capacity.

The evaluation may further in additional comprise combinations of these evaluations according to some embodiments.

Action 509

This action may be comprised within some alternative embodiments, but not necessarily within all imaginable embodiments of the method.

The coordination group may be split, if the result of the evaluation 508 is that it is advantageous to split the coordination group, according to some embodiments.

Splitting the coordination group may comprise providing a token each to the first network node 120-1 and the second network node 120-2 that together are forming the coordination group, after the split.

Splitting may occur whenever the mutual benefit between the participating network nodes 120-1, 120-2 of cooperation would be low. For instance, if two network nodes 120-1, 120-2 serve one user equipment 110-1, 110-2 each that are well isolated from each other, in terms of receiving low or no interference from the neighbouring network node 120-1, 120-2, it may make sense to serve these user equipment 110-1, 110-2 separately to fully utilize the spatial multiplexing gains offered by 1-reuse and save on complexity and backhaul capacity, according to some embodiments. Further, the assumed fact that all network nodes 120 transmit on the same frequency may be utilized, according to some embodiments.

Figure 6:
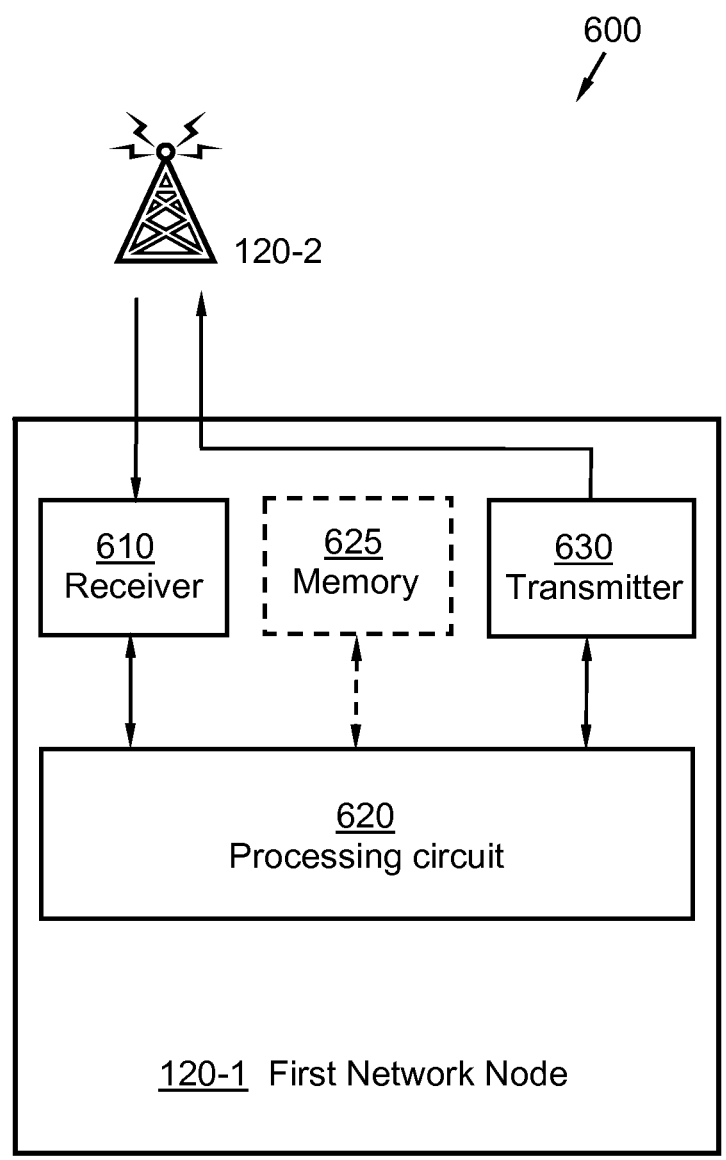
FIG. 6 is a schematic block diagram illustrating an embodiment of an arrangement in a first network node.

FIG. 6 is a block diagram illustrating an arrangement 600 within a first network node 120-1, serving a first cell 130-1. The arrangement 600 may be configured to perform any, some or all of the previously described actions 501-509 for forming a coordination group for coordinating multipoint wireless communication.

The coordination group may be formed by the first network node 120-1 together with a second network node 120-2, which both may be comprised in a wireless communication system 100. The wireless communication system 100 may be based on e.g. the Long-Term Evolution project within the Third Generation Partnership Project according to some embodiments, wherein the network nodes 120-1, 120-2 may comprise an Evolved Node B. However, the wireless communication system 100 may be further based on WCDMA, according to some embodiments, wherein the network nodes 120-1, 120-2 may comprise a Node B, in conjunction with a Radio Network Controller, according to some embodiments.

For the sake of clarity, any internal electronics or other components of the first network node 120-1, not completely indispensable for understanding the present method has been omitted from FIG. 6.

In order to perform the actions 501-509 correctly, the arrangement 600 comprises a processing circuit 620. The processing circuit 620 is configured to determine interference within the first cell 130-1. Further, the processing circuit 620 is configured to identify a second network node 120-2. The processing circuit 620 is in addition also configured to form a coordination group together with the second network node 120-2.

The arrangement 600 also comprises a receiver 610, configured to receive an acceptance of an invitation from the second network node 120-2. The receiver 610 may also be configured to detect a signal emitted from another node 110-1, 110-2, 120-2, 120-3, according to some embodiments.

Additionally, the arrangement 600 further comprises a transmitting mechanism 630, configured to transmit a token to the identified second network node 120-2. The token to be transmitted invites the second network node 120-2 to coordinate the wireless communication with the first network node 120-1.

The processing circuit 620 may comprise e.g. one or more instances of a Central Processing Unit (CPU), a processing unit, a processor, a microprocessor, or other processing logic that may interpret and execute instructions. The processing circuit 620 may further perform data processing functions for inputting, outputting, and processing of data comprising data buffering and device control functions, such as call processing control, user interface control, or the like.

In addition, the arrangement 600 in addition may comprise a memory 625. The memory may be configured to store e.g. threshold values, information about neighbour network nodes 120-2, 120-3 and other information that may serve the herein discussed method.

Further, it is to be noted that some of the described units 610-630 comprised within the arrangement 600 in the wireless communication system 100 are to be regarded as separate logical entities but not with necessity separate physical entities.

The actions 501-509 to be performed in the first network node 120-1 may be implemented through one or more processing circuits 620 in the first network node 120-1, together with computer program code for performing any, some or all of the functions of the actions 501-509 described above. Thus a computer program product, comprising instructions for performing the actions 501-509 in the first network node 120-1 may form a coordination group for coordinating multipoint wireless communication, when being loaded into the one or more processing circuits 620.

The computer program product mentioned above may be provided for instance in the form of a data carrier carrying computer program code for performing at least some of the actions 501-509 according to some embodiments when being loaded into the processing circuit 620. The data carrier may comprise e.g. a hard disk, a CD ROM disc, a memory stick, an optical storage device, a magnetic storage device or any other appropriate medium comprising a persistent or non-persistent memory such as a disk or tape that may hold machine readable data. The computer program product may furthermore be provided as computer program code on a server and downloaded to the first network node 120-1 remotely, e.g. over an Internet or an intranet connection.

Figure 7:
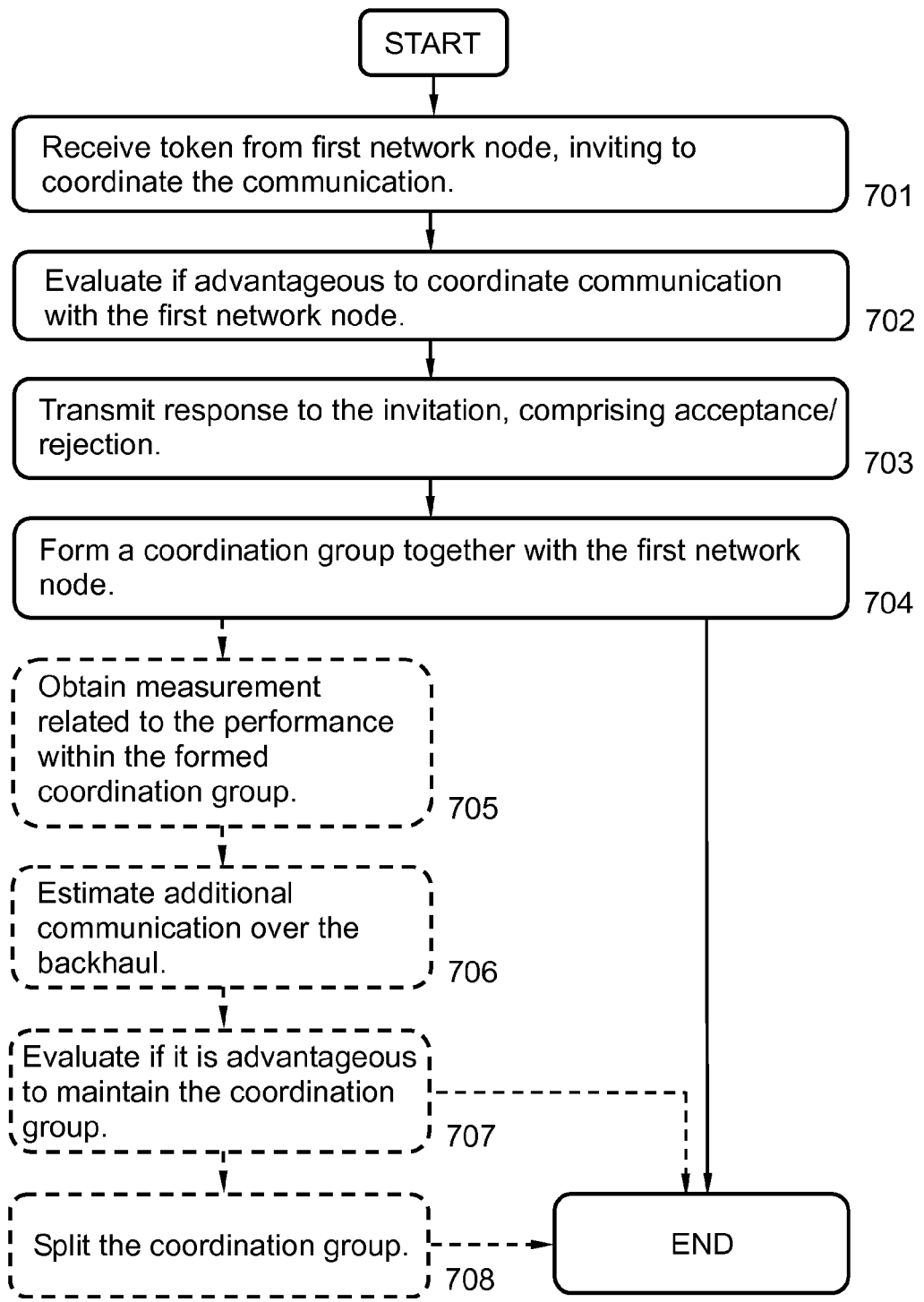
FIG. 7 is a schematic flow chart illustrating an embodiment of a method in a second network node.

FIG. 7 is a flow chart illustrating embodiments of a method in a second network node 120-2. The method aims at forming a coordination group for coordinating multipoint wireless communication. The coordination group may be formed by the second network node 120-2 together with a first network node 120-1, which both may be comprised in a wireless communication system 100. The wireless communication system 100 may be based on e.g. the Long-Term Evolution project within the Third Generation Partnership Project according to some embodiments, wherein the network nodes 120-1, 120-2 may comprise an Evolved Node B. However, the wireless communication system 100 may be further based on WCDMA, according to some embodiments, wherein the network nodes 120-1, 120-2 may comprise a Node B, in conjunction with a Radio Network Controller, according to some embodiments.

To appropriately form the coordination group for coordinating multipoint wireless communication, the method may comprise a number of actions 701-708.

It is however to be noted that some of the described actions, e.g. action 701-708 may be performed in a somewhat different chronological order than the enumeration indicates Further, any, some or all actions, such as e.g. 701 and 702 may be performed simultaneously or in a rearranged chronological order. Also, it is to be noted that some of the actions may be performed within some alternative embodiments, such as e.g. action 705-708. The method may comprise the following actions:

Action 701

A token is received from the first network node 120-1, which token is inviting the second network node 120-2 to coordinate the wireless communication with the first network node 120-1.

Action 702

It is evaluated if it is advantageous to coordinate the wireless communication of the second network node 120-2 with the first network node 120-1.

The evaluation of the advantage of coordinating the wireless communication with the first network node 120-1 may be based on one or more of: comparison with a size limitation value, limiting the number of network nodes 120-1, 120-2 that are allowed in the coordination group; capacity of a backhaul 150; compatibility between the first network node 120-1 and the second network node 120-2; detected interference of radio signal reception within a second cell 130-2, served by the second network node 120-2; comparison of detected interference with a threshold value; comparing the advantage to form the coordination group with the first network node 120-1 with an estimated value of grouping with another network node 120-3. The interference threshold value may be set lower compared to in the first network node 120-1 considering the combined improvement by forming a CoMP group. Alternatively an interference or utility measure is received with the token and the combined interference or utility is compared with a threshold evaluating the total CoMP improvement for both network nodes 120-1, 120-2.

Action 703

A response comprising an acceptance to the received token is transmitted, to be received by the first network node 120-1. The acceptance is only transmitted if it is advantageous to coordinate the wireless communication with the first network node 120-1. Otherwise the response comprises a rejection, if the evaluation 702 does not result in a conclusion that it is advantageous to coordinate the wireless communication with the first network node 120-1.

Action 704

A coordination group is formed together with the first network node 120-1. Thereby, the wireless communication of the first network node 120-1 is coordinated with the second network node 120-2, if evaluation 702 results in that it is advantageous to coordinate the wireless communication of the second network node 120-2 with the first network node 120-1.

The coordination group that may be formed together with the first network node 120-1 may comprise defining a common cell 140, according to some embodiments. Thus the wireless communication of the first network node 120-1 may be coordinated with the second network node 120-2 within the common cell 140.

Action 705

This action may be comprised within some alternative embodiments, but not necessarily within all imaginable embodiments of the method.

A measurement related to performance within the formed coordination group may be obtained.

Action 706

This action may be comprised within some alternative embodiments, but not necessarily within all imaginable embodiments of the method.

An amount of additional communication over the backhaul 150 between the first network node 120-1 and the second network node 120-2 may be measured or estimated, after having formed 704 the coordination group.

Action 707

This action may be comprised within some alternative embodiments, but not necessarily within all imaginable embodiments of the method.

An evaluation may be made, evaluating if it is advantageous to maintain the coordination group or to split the coordination group, based on the obtained 705 measurement related to the performance, and the estimated 706 additional communication over the backhaul 150.

Action 708

This action may be comprised within some alternative embodiments, but not necessarily within all imaginable embodiments of the method.

The coordination group may be split, if the result of the evaluation 707 is that it is advantageous to split the coordination group.

In a scenario wherein more than two networks nodes 120-1, 120-2 may form the coordination group, it may be one of the comprised networks nodes 120-1, 120-2 that wants to split off, or it may be the group as such which jointly finds reasons to split up, i.e. ungroup.

When splitting the coordination group, the token may be returned to the first network node 120-1. Alternatively, the token of the coordination group may be split between the involved networks nodes 120-1, 120-2, according to some embodiments.

Figure 8:
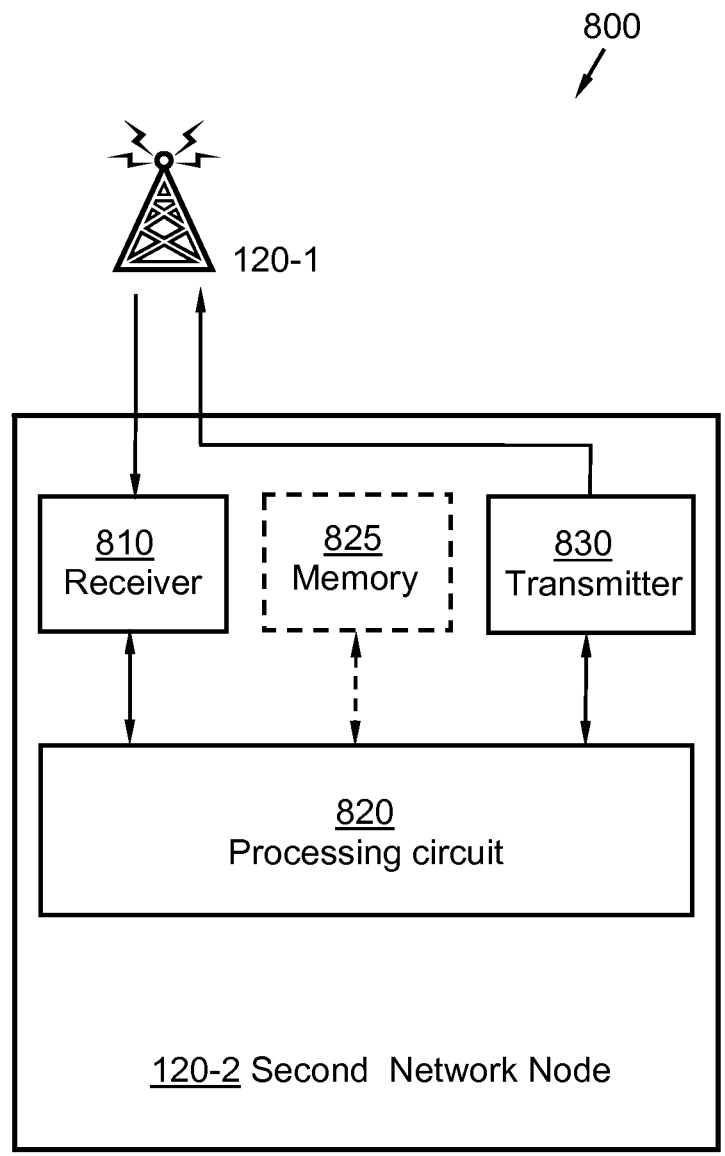
FIG. 8 is a schematic block diagram illustrating an embodiment of an arrangement in a second network node.

FIG. 8 is a block diagram illustrating an arrangement 800 within a second network node 120-2. The arrangement 800 is configured to perform any, some or all of the previously described actions 701-708 for forming a coordination group for coordinating multipoint wireless communication.

The coordination group may be formed by the second network node 120-2 together with a first network node 120-1, which both may be comprised in a wireless communication system 100. The wireless communication system 100 may be based on e.g. the Long-Term Evolution project within the Third Generation Partnership Project according to some embodiments, wherein the network nodes 120-1, 120-2 may comprise an Evolved Node B. However, the wireless communication system 100 may be further based on WCDMA, according to some embodiments, wherein the network nodes 120-1, 120-2 may comprise a Node B, in conjunction with a Radio Network Controller, according to some embodiments.

For the sake of clarity, any internal electronics or other components of the second network node 120-2, not completely indispensable for understanding the present method has been omitted from FIG. 8.

In order to perform the actions 701-708 correctly, the arrangement 800 comprises a processing circuit 820. The processing circuit 820 is configured to evaluate if it is advantageous to coordinate the wireless communication with the first network node 120-1. Further, the processing circuit 820 is also configured to form a coordination group together with the first network node 120-1. The processing circuit 820 is further in addition configured to coordinate the wireless communication with the first network node 120-1, if it is advantageous to coordinate the wireless communication with the first network node 120-1.

Also, the arrangement 800 comprises a receiver 810. The receiver 810 is configured to receive a token from the first network node 120-1. The token is inviting the second network node 120-2 to coordinate the wireless communication with the first network node 120-1.

Additionally, the arrangement 800 further comprises a transmitting mechanism 830. The transmitting mechanism 830 is configured to transmit a response comprising an acceptance to the received token, to be received by the first network node 120-1, if it is considered advantageous to coordinate the wireless communication with the first network node 120-1, otherwise the response comprises a rejection.

The processing circuit 820 may comprise e.g. one or more instances of a Central Processing Unit (CPU), a processing unit, a processor, a microprocessor, or other processing logic that may interpret and execute instructions. The processing circuit 820 may further perform data processing functions for inputting, outputting, and processing of data comprising data buffering and device control functions, such as call processing control, user interface control, or the like.

In addition, the arrangement 800 in addition may comprise a memory 825. The memory may be configured to store e.g. threshold values, information about neighbour network nodes 120-2, 120-3 and other information that may serve the herein discussed method.

Further, it is to be noted that some of the described units 810-830 comprised within the arrangement 800 in the wireless communication system 100 are to be regarded as separate logical entities but not with necessity separate physical entities.

The actions 701-708 to be performed in the second network node 120-2 may be implemented through one or more processing circuits 820 in the second network node 120-2, together with computer program code for performing any, some or all of the functions of the actions 701-708 described above. Thus a computer program product, comprising instructions for performing the actions 701-708 in the second network node 120-2 may form a coordination group for coordinating multipoint wireless communication, when being loaded into the one or more processing circuits 820.

The computer program product mentioned above may be provided for instance in the form of a data carrier carrying computer program code for performing at least some of the actions 701-708 according to some embodiments when being loaded into the processing circuit 820. The data carrier may comprise e.g. a hard disk, a CD ROM disc, a memory stick, an optical storage device, a magnetic storage device or any other appropriate medium comprising a persistent or non-persistent memory such as a disk or tape that may hold machine readable data. The computer program product may furthermore be provided as computer program code on a server and downloaded to the second network node 120-2 remotely, e.g. over an Internet or an intranet connection.

When using the formulation "comprise" or "comprising" within the present context, it is to be interpreted as non-limiting, i.e. meaning "consist at least of". The present methods and arrangements are not limited to the above described preferred embodiments. Various alternatives, modifications and equivalents may be utilized. Therefore, the above embodiments are not to be taken as limiting the scope of claimed protection, which instead is to be defined by the appending claims.

The invention claimed is:

1. A method in a first network node, serving a first cell, for forming a coordination group for coordinating multipoint wireless communication, the method comprising:
   determining interference within the first cell,
   identifying a second network node, which is either
      transmitting radio signals causing the interference within the first cell,
      serving a first user equipment, which transmits radio signals causing the interference within the first cell, or
      being the intended recipient of radio signals causing the interference within the first cell,
   transmitting a token to the identified second network node, inviting the second network node to coordinate the multipoint wireless communication with the first network node, and
   when an acceptance is received from the second network node, forming a coordination group together with the second network node, and coordinating the wireless communication of the first network node with the second network node,
   the method further comprising comparing a number of network nodes that are allowed in the coordination group with a predetermined coordination group size limitation value before forming the coordination group together with the second network node.

2. The method according to claim 1, further comprising
   obtaining a measurement related to performance within the formed coordination group,
   estimating an amount of additional communication over a backhaul between the first network node and the second network node, after having formed the coordination group,
   evaluating if it is advantageous to maintain the coordination group or to split the group, based on the obtained measurement related to the performance, and the estimated additional communication over the backhaul, and
   splitting the coordination group, if the result of the evaluation is that it is advantageous to split the coordination group.

3. The method according to claim 2, wherein the evaluation if it is advantageous to maintain the coordination group or to split the group further comprises comparing the estimated amount of additional communication over the backhaul with a backhaul load threshold value.

4. The method according to claim 2, wherein splitting the coordination group comprises providing a token each to the first network node and the second network node that together are forming the coordination group after the split.

5. The method according to claim 2, wherein the evaluation of the advantage to maintain the coordination group further comprises comparing the advantage of maintaining the coordination group with an estimated advantage of instead grouping with another network node.

6. The method according to claim 1, further comprising:
   receiving a token, which token is unique for the first network node comprised in a wireless communication system.

7. The method according to claim 1, wherein each of the first network node, the second network node and the coordination group is restricted to hold only one token at a time, and wherein the formation of the coordination group comprises merging the token of the first network node with the token of the second network node.

8. The method according to claim 1, wherein
   forming the coordination group together with the second network node comprises defining a common cell and coordinating the wireless communication of the first network node with the second network node within the common cell.

9. The method according to claim 1, wherein the determined interference within the first cell comprises receiving a report of detected interference from a second user equipment situated in the first cell.

10. The method according to claim 1, wherein the determined interference within the first cell comprises a signal transmitted from the first user equipment served by the second network node detected by the first network node.

11. The method according to claim 1, wherein the determined interference within the first cell comprises an inter cell interference signal transmitted from the second network node detected by the first network node.

12. The method according to claim 1, wherein the determined interference within the first cell is based on statistics of interference caused by one or more sources of interference collected over a time period.

13. The method according to claim 1, wherein each of the first network node, the second network node and the coordination group is restricted to hold only one token at a time per resource block, such that different coordination groups are enabled for different resources.

14. The method according to claim 1, wherein the token comprises information concerning a level of estimated advantage for the first network node to form the coordination group together with the second network node.

15. An arrangement in a first network node, serving a first cell, for forming a coordination group for coordinating multipoint wireless communication, the arrangement comprising:
a processing circuit configured to determine interference within the first cell, identify a second network node, and form a coordination group together with the second network node,
a transmitter configured to transmit a token to the identified second network node inviting the second network node to coordinate a wireless communication with the first network node
a receiver configured to receive, from the second network node, an acceptance of an invitation to coordinate the multipoint wireless communication with the first network node,
the processing circuit further configured to:
compare a number of network nodes allowed in the coordination group with a predetermined coordination group size limitation value before forming the coordination group together with the second network node,
form a coordination group together with the second network node based on the comparison, and
coordinate the wireless communication of the first network node with the second network node in the formed coordination group.

16. A method in a second network node for forming a coordination group for coordinating multipoint wireless communication, the method comprising
receiving a token from the first network node, which token invites the second network node to coordinate a wireless communication with the first network node,
evaluating if it is advantageous to coordinate the wireless communication of the second network node with the first network node,
transmitting a response comprising an acceptance to the received token to be received by the first network node if it is advantageous to coordinate the wireless communication with the first network node, otherwise the response comprises a rejection,
forming a coordination group together with the first network node, and coordinating the wireless communication with the first network node if it is advantageous to coordinate the wireless communication with the first network node,
wherein the evaluation of the advantage of coordinating the wireless communication with the first network node is based on comparison with a predetermined size limitation value limiting the number of network nodes that are allowed in the coordination group.

17. The method according to claim 16, wherein:
the evaluation of the advantage of coordinating the wireless communication with the first network node is further based on one or more of:
compatibility between the first network node and the second network node;
detected interference of radio signal reception within a second cell served by the second network node;
comparison of detected interference with a threshold value; and
comparing the advantage to form the coordination group with the first network node with an estimated value of grouping with another network node.

18. The method according to claim 16, further comprising:
obtaining a measurement related to performance within the formed coordination group,
estimating an amount of additional communication over the backhaul between the first network node and the second network node, after having formed the coordination group,
evaluating if it is advantageous to maintain the coordination group or to split the coordination group based on the obtained measurement related to the performance, and the estimated additional communication over the backhaul, and
splitting the coordination group if the result of the evaluation is that it is advantageous to split the coordination group.

19. The method according to claim 16, wherein forming the coordination group together with the first network node comprises defining a common cell and coordinating the wireless communication of the first network node with the second network node within the common cell.

20. An arrangement in a second network node for forming a coordination group for coordinating multipoint wireless communication, the arrangement comprising:
a receiver configured to receive a token from the first network node, which token invites the second network node to coordinate a wireless communication with the first network node,
a processing circuit configured to evaluate if it is advantageous to coordinate the wireless communication with the first network node, form a coordination group together with the first network node, and coordinate the wireless communication with the first network node if it is advantageous to coordinate the wireless communication with the first network node, and
a transmitting mechanism configured to transmit a response comprising an acceptance to the received token to be received by the first network node if it is advantageous to coordinate the wireless communication with the first network node, otherwise the response comprises a rejection,
wherein the evaluation of the advantage of coordinating the wireless communication with the first network node is based on comparison with a predetermined size limitation value limiting the number of network nodes that are allowed in the coordination group.

* * * * *

UNITED STATES PATENT AND TRADEMARK OFFICE
CERTIFICATE OF CORRECTION

| | | |
|---|---|---|
| PATENT NO. | : 8,838,118 B2 | Page 1 of 1 |
| APPLICATION NO. | : 13/502939 | |
| DATED | : September 16, 2014 | |
| INVENTOR(S) | : Simonsson et al. | |

It is certified that error appears in the above-identified patent and that said Letters Patent is hereby corrected as shown below:

In the specification,

In Column 10, Line 32, delete "cell 130," and insert -- cell 130, 140 --, therefor.

In Column 17, Line 11, delete "system when" and insert -- system 100 when --, therefor.

In Column 18, Line 22, delete "memory may" and insert -- memory 625 may --, therefor.

In Column 21, Line 27, delete "memory may" and insert -- memory 825 may --, therefor.

Signed and Sealed this
Seventeenth Day of November, 2015

Michelle K. Lee
*Director of the United States Patent and Trademark Office*